United States Patent
Tanaka

(10) Patent No.: US 7,186,078 B2
(45) Date of Patent: Mar. 6, 2007

(54) TURBINE SHROUD SEGMENT

(75) Inventor: Agamu Tanaka, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 436 days.

(21) Appl. No.: 10/740,663

(22) Filed: Dec. 22, 2003

(65) Prior Publication Data

US 2005/0002779 A1     Jan. 6, 2005

(30) Foreign Application Priority Data

Jul. 4, 2003   (JP)   ............................. 2003-271196
Jul. 4, 2003   (JP)   ............................. 2003-271197

(51) Int. Cl.
    *F01D 11/00*   (2006.01)
(52) U.S. Cl. ................ 415/170.1; 415/173.1; 415/173.6
(58) Field of Classification Search ............. 415/170.1, 415/173.1, 173.6
    See application file for complete search history.

(56) References Cited

U.S. PATENT DOCUMENTS

| | | | |
|---|---|---|---|
| 3,825,364 A * | 7/1974 | Halila et al. ................. 415/116 |
| 5,127,793 A * | 7/1992 | Walker et al. ............... 415/115 |
| 5,188,507 A | 2/1993 | Sweeney |
| 5,584,651 A * | 12/1996 | Pietraszkiewicz et al. .. 415/115 |
| 6,354,795 B1 * | 3/2002 | White et al. ................. 415/116 |
| 2005/0004810 A1 * | 1/2005 | Tanaka ........................... 705/1 |

FOREIGN PATENT DOCUMENTS

JP          9-329003          12/1997

* cited by examiner

*Primary Examiner*—Hoang Nguyen
(74) *Attorney, Agent, or Firm*—Oblon, Spivak, McClelland, Maier & Neustadt, P.C.

(57) ABSTRACT

A shroud segment for being incorporated in a gas turbine engine so as to suppress influence of hot combustion gas on a turbine case of the gas turbine engine is provided with a back plate having first and second plate portions formed in an arc shape and supported by the turbine case, a touching member integrally formed on an inner surface of the back plate for touching with a rotating turbine blade, a pair of first seal slots for receiving a pair of first spline seal plate, a pair of second seal slots for receiving a pair of second spline seal plate and a pair of seal gaps respectively communicating with the first seal slots and the second seal slots. The seal gaps are respectively provided with abutment surfaces recessed from front surfaces of the second seal slots so as to receive front ends of the first spline seal plates.

8 Claims, 5 Drawing Sheets

TURBINE SHROUD SEGMENT

BACKGROUND OF THE INVENTION

1. Field of the Invention

The present invention relates to a gas turbine engine for an aircraft and such and more particularly relates to a shroud segment of a turbine shroud for the gas turbine engine.

2. Description of the Related Art

A turbine of a gas turbine engine for an aircraft and such is provided with plural stages of turbine shrouds for suppressing influence of hot combustion gas on a turbine case. The turbine shrouds are directly exposed to the hot gas and thereby a severe thermal stress might be applied thereto. To avoid an excessive thermal stress, in common, each turbine shroud is segmented. Plural shroud segments are built up to form each turbine shroud.

Each shroud segment is provided with a back plate, as a main body thereof, formed in an arc shape. An outer surface of the back plate is supported by the turbine case. An inner surface of the back plate is integrally provided with a touching member for touching with rotating turbine blades, which is formed in a honeycomb shape or the like. The back plate is further provided with a first plate portion and a second plate portion.

Both side surfaces of the back plate are respectively provided with first sealing slots. The first sealing slots receive first spline seal plates for suppressing leakage of the hot combustion gas to the low-pressure turbine case.

Similarly, both side surfaces of the second plate portion are respectively provided with second sealing slots communicating with the first sealing slots. The second sealing slots also receive second spline seal plates for suppressing leakage of the hot combustion gas to the low-pressure turbine case.

Such a shroud segment with first and second spline seal plates effectively suppress the leakage of the hot combustion gas to the low-pressure turbine case so that excessive heating of the low-pressure turbine case is prevented.

A related art is discloses in Japanese Patent Application Laid-open No. H09-329003.

SUMMARY OF THE INVENTION

The first and second spline seal plates might come off from the seal slots. To avoid coming off, a front end of the first spline seal plate should be bent so as to abut an outer band of a turbine nozzle disposed at a former stage of the turbine shroud. However, the bent first spline seal plates become more rigid and lose elasticity. This leads to decrease of effect of suppressing the leakage of the hot combustion gas.

The present invention is achieved in view of solving the above problem and intended for providing a shroud segment which prevent the first spline seal plate from coming off without bending the first spline seal plate.

According to an aspect of the present invention, a shroud segment for being incorporated in a gas turbine engine so as to suppress influence of hot combustion gas on a turbine case of the gas turbine engine is provided with a back plate formed in an arc shape and supported by the turbine case, the back plate comprising a first plate portion and a second plate portion integrally formed on an axially front end of the first plate portion and extended radially inward, a touching member integrally formed on an inner surface of the back plate for touching with a rotating turbine blade, a pair of first seal slots for receiving a pair of first spline seal plate, the first seal slots being formed on circumferentially both sides of the first plate portion and extended substantially across a whole length of the first plate portion, a pair of second seal slots for receiving a pair of second spline seal plate, the second seal slots being formed on circumferentially both sides of the second plate portion and extended substantially across a whole length of the second plate portion, and a pair of seal gaps respectively communicating with the first seal slots and the second seal slots, the seal gaps respectively comprising abutment surfaces recessed from front surfaces of the second seal slots so as to receive front ends of the first spline seal plates.

More preferably, the shroud segment is further provided with a pair of first spline seal plates inserted in the first seal slots and a pair of second spline seal plates inserted in the second seal slots.

More preferably, an angle made by a first plane parallel to the first seal slot and a second plane parallel to the abutment surface is configured to be larger than 110 degrees and smaller than 125 degrees.

More preferably, the shroud segment is further provided with a front seal connected with a front end surface of the back plate so as to seal hot combustion gas leakage from a radially inner side of the back plate to the turbine case.

More preferably, the front seal is configured to steadily contact with an outer band of a turbine nozzle disposed at a former stage of the shroud segment by means of elastic force thereof.

DETAILED DESCRIPTION OF THE PREFERRED EMBODIMENT

An embodiment of the present invention will be described hereinafter with reference to FIGS. 1 through 5. Throughout the specification, definition of directions such as front and rear is consistent with directions of elements in practical use. For example, a front end is illustrated on left hand in FIGS. 1 and 5. In and out are defined by near and far from an axis of a turbine engine.

Figure 5:
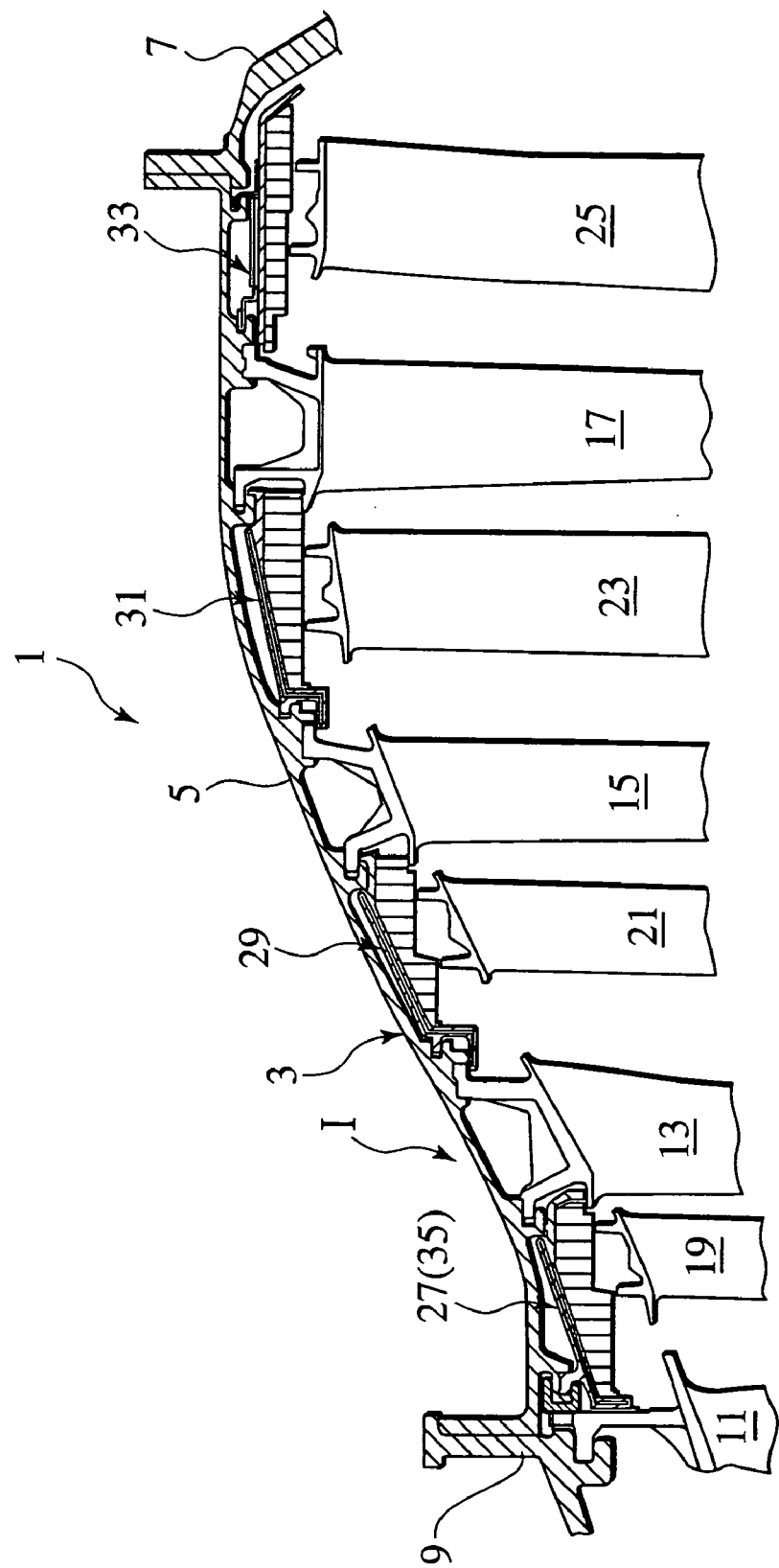
FIG. 5 is a sectional view of a low-pressure turbine for an aircraft, to which the shroud segment is installed.

Referring is now made to FIG. 5. A low-pressure turbine 1 of a turbine engine for an aircraft is provided with a turbine case 3. The turbine case 3 is provided with a main turbine case 5 and a rear turbine case 7 integrally connected with a rear end of the turbine case 5. A front end of the main turbine case 5 is connected with a high-pressure turbine case 9.

A plurality of turbine nozzles 13, 15 and 17 for rectifying the hot gas are fixed to and housed in the main turbine case 5. Each of the turbine nozzles 13, 15 and 17 is segmented to be plural nozzle segments which are butted end to end to form a complete ring. A plurality of turbine rotors are disposed alternately with the turbine nozzles 13, 15 and 17 and respectively provided with turbine blades 19, 21, 23 and 25. The turbine rotors unitedly rotate and are connected to a rotor of a low-pressure compressor (not shown) and a fan rotor of a fan (not shown). Turbine shrouds 27, 29, 31 and 33 are respectively disposed around the turbine rotors. Each of the turbine shrouds 27, 29, 31 and 33 is segmented to be plural shroud segments which are butted end to end to form a complete ring.

The hot gas having energy is supplied from a combustor (not shown) to the low-pressure turbine 1 so as to rotate the turbine rotors to which the low-pressure compressor and the fan are connected. Thereby the low-pressure turbine 1 extracts the energy from the hot gas and converts it to power to drive the low-pressure compressor and the fan.

Shroud segments 35 shown in FIGS. 1 through 4 are segmented from the turbine shroud 27, which is disposed at a first stage of the low-pressure turbine 1. Each shroud segment 35 is provided with a back plate 37 formed in an arc shape. The back plate 37 is provided with a first plate portion 37a and a second plate portion 37b which is formed on a front end of the first plate portion 37a and directed radially inward.

A segment hook 43 is integrally formed on an radially outer surface of the back plate 37 in the vicinity of the front end thereof annularly and projecting forwardly. The segment hook 43 can be tightly fitted to an annular groove 41 of a front case hook 39 of the main turbine case 5. A C-clip 45 having a C-letter sectional shape is pinched on the front case hook 39 and the segment hook 43 so that the segment hook 43 is fixed to the front case hook 39. Thereby the front end of the back plate 37 is supported by the main turbine case 5 so as to be immovable in the axial direction.

A rear end of the back plate 37, an outer band 47 of a turbine nozzle 13 in rear of and adjacent to the shroud segment 35 and a rear case hook 49 of the main turbine case 5 are slidably engaged with each other. Thereby the rear end of the back plate 37 is supported by the outer band 47 and the rear case hook 49 so as to be movable in the axial direction. Such support manner allows thermal displacement of the back plate 37.

A bump 51 having an arc shape is formed on a radially outer surface of the rear end of the back plate 37 so as to be engageable with a rear case hook 49 formed on a radially inner surface of the main turbine case 5. The bump 51 has a bump surface 51fa, which is perpendicular to the turbine axis and opposed to an axially front surface 49fa of the rear case hook 49, and a cylindrical surface 51fb, which is parallel to the turbine axis and opposed to a cylindrical inner surface 49fb of the rear case hook 49. The cylindrical surface 51fb is integrally provided with an annular rib 53 for contacting with the cylindrical inner surface 49fb.

An axial clearance is formed between the bump surface 51fa of the bump 51 and the axially front surface 49fa of the rear case hook 49. The axial clearance is configured so as to regulate a flow rate of cooling air CA flowing between the main turbine case 5 and the back plate 37 to be a predetermined flow rate. Additionally, the axial clearance is set to be narrower than a radial clearance between the cylindrical surface 51fb of the bump 51 and the cylindrical inner surface 49fb of the rear case hook 49 in a steady state when the bump 51 is engaged with the rear case hook 49. Meanwhile, the cooling air CA is supplied from the low-pressure compressor and is conducted via a conduction aperture 55h formed on an outer band 55 of a turbine nozzle 11 which is disposed adjacent to and in front of the shroud segment 37.

Figure 1:
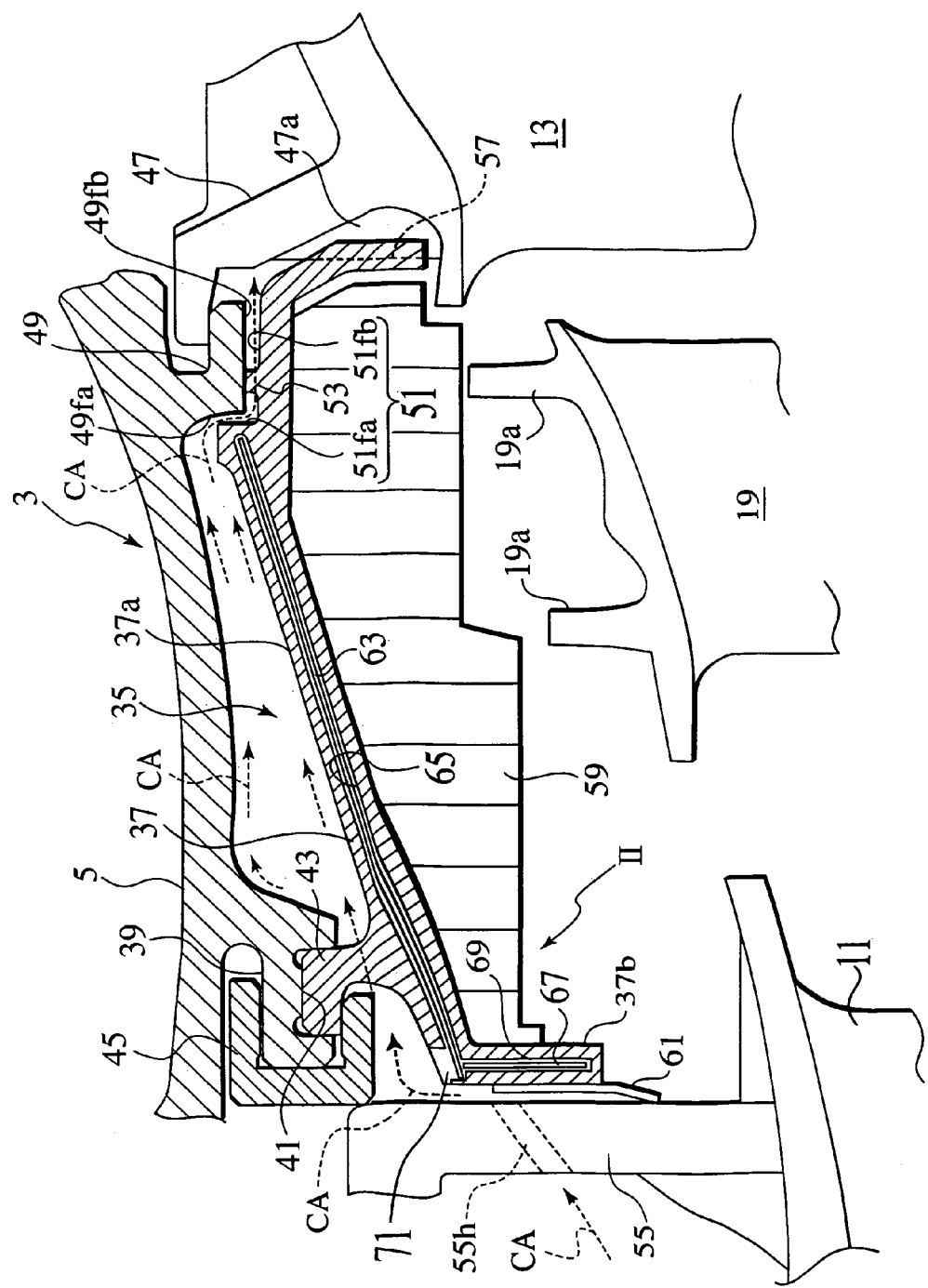
FIG. 1 is a sectional view of a shroud segment according to an embodiment of the present invention, taken from an arrow I of FIG. 5.
Figure 4:
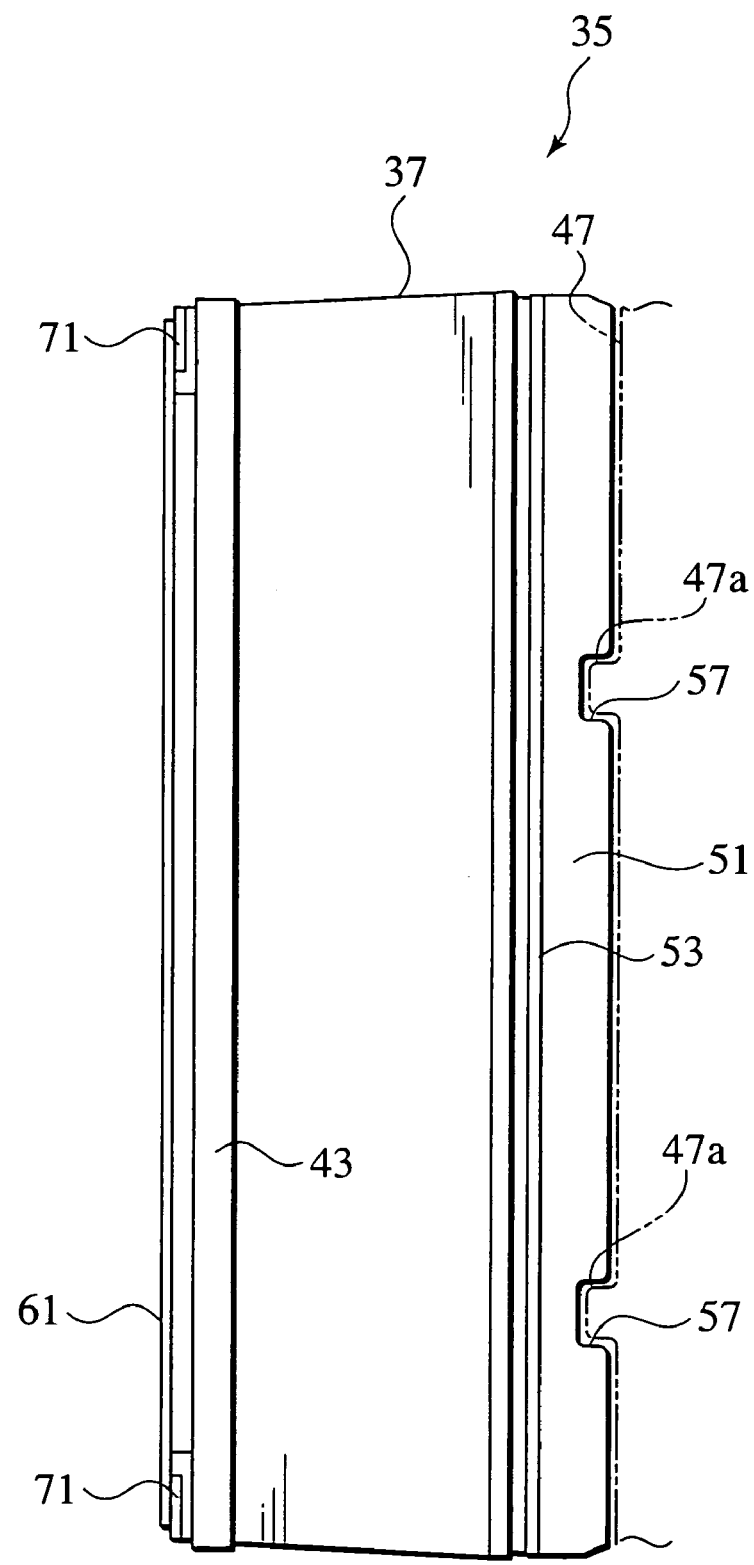
FIG. 4 is a plan view of the shroud segment.

The rear end of the back plate 37 is provided with a recess 57 as shown in FIGS. 1 and 4, with which a tab 47a of the outer band 47 is engaged so that relative rotation thereof is pinned.

An inner surface of the back plate 37 is integrally provided with a honeycomb cell 59 for touching with tip fins 19a of rotating turbine blades 19. The honeycomb cell 59 is not limited to a honeycomb shaped member. Any touching member can be substituted therefor.

The second plate portion 37b is integrally provided with a front seal 61 formed in an annular plate shape on an axially front surface thereof as shown in FIG. 1. The front seal 61 suppresses leakage of the hot combustion gas from a radially inner side of the back plate 37 to the low-pressure turbine case 3 and further suppresses leakage of the cooling air CA from the conduction aperture 55h to the radially inner side of the back plate 37. The front seal 61 has elasticity and is configured to steadily contact with the outer band 55 of the turbine nozzle 11 by means of the elastic force.

Figure 2:
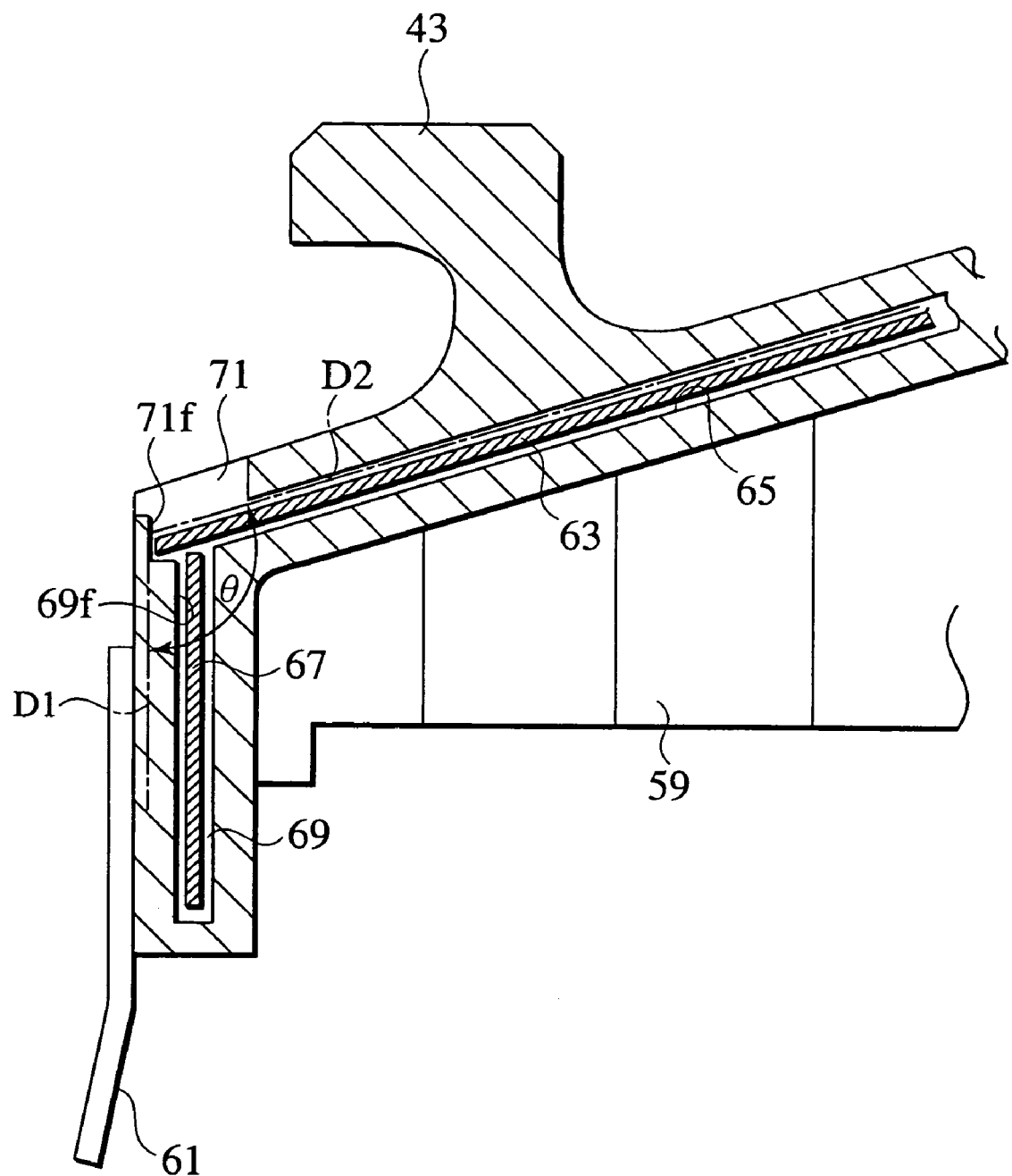
FIG. 2 is an enlarged view of the shroud segment around a front end thereof, taken from an arrow II of FIG. 1.
Figure 3:
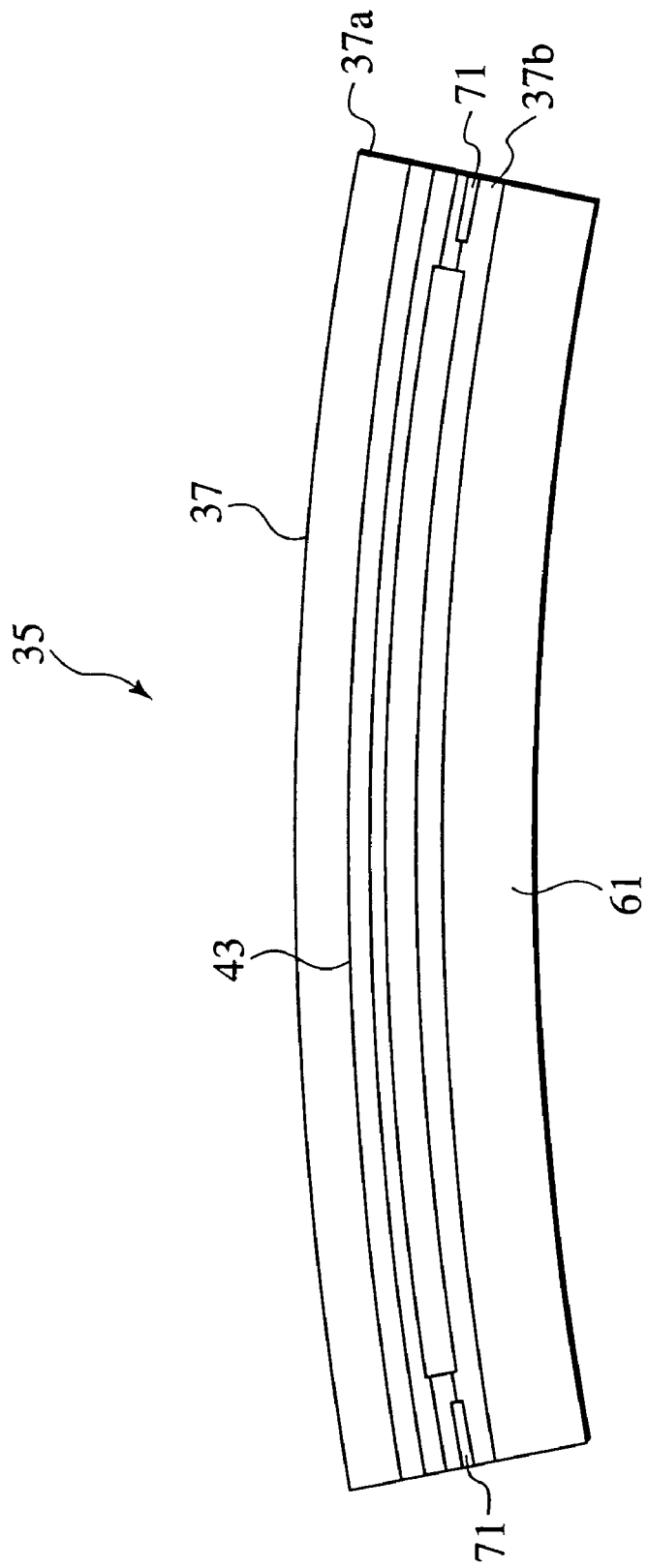
FIG. 3 is a front view of the shroud segment.

Both side surfaces of the first plate portion 37a are respectively provided with first sealing slots 65 as shown in FIGS. 1 and 2. The first sealing slots 65 receive first spline seal plates 63. The first spline seal plates 63 suppress leakage of the hot combustion gas to the low-pressure turbine case 3 and further suppresses leakage of the cooling air CA to the radially inner side of the back plate 37.

Similarly, both side surfaces of the second plate portion 37b are respectively provided with second sealing slots 69 communicating with the first sealing slots 65. The second sealings lots 69 also receive second spline seal plates 67. The second spline seal plates 67 suppress leakage of the hot combustion gas to the low-pressure turbine case 3 and further suppresses leakage of the cooling air CA to the radially inner side of the back plate 37.

Both sides of the front end of the first plate portion 37a are provided with a pair of seal gaps 71 as shown in FIG. 1 and 4. Each of the seal gaps 71 communicates with the first seal slot 65 and the second seal slot 69 on the same side. Each of the seal gaps 71 is provided with an abutment surface 71f so that the first spline seal plate 63 is stopped thereby. The abutment surfaces 71f are slightly recessed from front surfaces 69f of the second seal slots 69. An angle θ made by a plane D1 parallel to the abutment surface 71f and a plane D2 parallel to the first seal slot 65 shown in FIG. 2 is configured to be larger than 110 degrees and smaller than 125 degrees.

Working and effects of the shroud segment 35 according to the present embodiment will be described hereinafter.

When installing the first spline seal plates 63 and the second spline seal plates 67, first the turbine shroud 27 is installed in the low-pressure turbine case 3, next both sides of each second spline seal plate 67 are inserted into seal gaps 71 of a pair of the shroud segments 35 which are adjacent to each other and finally further inserted into the second seal slots 69 thereof. Next, both ends of each first spline seal plate 63 are inserted into the seal gaps 71 of the pair of the shroud segments 35 and further inserted into the first seal slots 65. Thereby the first spline seal plates 63 and the second spline seal plates 67 are installed to the turbine shroud 27.

End surfaces of the second spline seal plates 67 abut the side surfaces of the first spline seal plates 63 so that the second spline seal plates 67 are prevented from coming off from the second seal slots 69. The end surfaces of the first spline seal plates 63 abut the abutment surfaces 71f so that the first spline seal plates 63 are prevented from coming off from the first seal slots 65. More particularly, the angle θ is set to be more than 110 degrees so that the end surfaces of the first spline seal plates 63 are prevented from going out by means of reactive force thereof applied by the abutment surfaces 71f. Furthermore, the angle θ is set to be less than 125 degrees so that the end surfaces of the first spline seal plates 63 are prevented from getting into the second seal slots 67 by means of reactive force thereof applied by the abutment surfaces 71f.

As well as the above working, the first spline seal plates 65 and the second spline seal plates 69 suppress the leakage of the hot combustion gas and the plural shroud segments 35 shield the low-pressure turbine case 3 form the hot combustion gas, thereby excessive heating of the low-pressure turbine case 3 is suppressed. Furthermore, the first spline seal plates 63, the second spline seal plates 67 and such suppress the leakage of the cooling air CA and the flow thereof between the main turbine case 5 and the back plate 37 rearward is assured in a condition that the flow rate thereof is regulated by means of the clearance between the bump surface 51fa and the front surface 49fa of the rear case hook 49. Thereby the cooling air CA effectively cools the low-pressure turbine case 3.

In addition to the above workings, the front seal 61 further suppress the leakage of the hot combustion gas to the low-pressure turbine case 3, thereby the shielding effect of the shroud segment 35 is further assured. The front seal 61 further suppress the leakage of the cooling air CA to the inner side of the back plate 37, thereby the cooling effect of the cooling air CA is further assured.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A shroud segment for being incorporated in a gas turbine engine so as to suppress influence of hot combustion gas on a turbine case of the gas turbine engine, comprising:
   a back plate formed in an arc shape and supported by the turbine case, the back plate comprising a first plate portion and a second plate portion integrally formed on an axially front end of the first plate portion and extended radially inward;
   a touching member integrally formed on an inner surface of the back plate for touching with a rotating turbine blade;
   a pair of first seal slots for receiving a pair of first spline seal plates, the first seal slots being formed on circumferentially both sides of the first plate portion and extended substantially across a whole length of the first plate portion;
   a pair of second seal slots for receiving a pair of second spline seal plates, the second seal slots being formed on circumferentially both sides of the second plate portion and extended substantially across a whole length of the second plate portion; and
   a pair of seal gaps respectively communicating with the first seal slots and the second seal slots to allow insertion of the first spline seal plates and the second spline seal plates, the seal gaps respectively comprising abutment surfaces recessed from front surfaces of the second seal slots so as to receive front ends of the first spline seal plates to prevent the first spline seal plates from displacing from the first seal slots.

2. The shroud segment of claim 1, further comprising:
   a pair of first spline seal plates inserted in the first seal slots; and
   a pair of second spline seal plates inserted in the second seal slots.

3. The shroud segment of claim 1, wherein:
   an angle made by a first plane parallel to the first seal slot and a second plane parallel to the abutment surface is configured to be larger than 110 degrees and smaller than 125 degrees.

4. The shroud segment of claim 1, further comprising:
   a front seal connected with a front end surface of the back plate so as to seal hot combustion gas leakage from a radially inner side of the back plate to the turbine case.

5. The shroud segment of claim 4, wherein:
   the front seal is configured to steadily contact with an outer band of a turbine nozzle disposed at a former stage of the shroud segment by means of elastic force thereof.

6. A shroud segment for being incorporated in a gas turbine engine so as to suppress influence of hot combustion gas on a turbine case of the gas turbine engine, comprising:
   a back plate formed in an arc shape and supported by the turbine case, the back plate comprising a first plate portion and a second plate portion integrally formed on an axially front end of the first plate portion and extended radially inward;
   a touching member integrally formed on an inner surface of the back plate for touching with a rotating turbine blade;
   a pair of first seal slots for receiving a pair of first spline seal plates, the first seal slots being formed on circumferentially both sides of the first plate portion and extended substantially across a whole length of the first plate portion;
   a pair of second seal slots for receiving a pair of second spline seal plates, the second seal slots being formed on circumferentially both sides of the second plate portion and extended substantially across a whole length of the second plate portion;
   a pair of seal gaps respectively communicating with the first seal slots and the second seal slots, the seal gaps respectively comprising abutment surfaces recessed from front surfaces of the second seal slots so as to receive front ends of the first spline seal plates; and
   an angle made by a first plane parallel to the first seal slots and a second plane parallel to the abutment surface is configured to be larger than 110 degrees and smaller than 125 degrees.

7. A shroud segment for being incorporated in a gas turbine engine so as to suppress influence of hot combustion gas on a turbine case of the gas turbine engine, comprising:
   a back plate formed in an arc shape and supported by the turbine case, the back plate comprising a first plate portion and a second plate portion integrally formed on an axially front end of the first plate portion and extended radially inward;
   a touching member integrally formed on an inner surface of the back plate for touching with a rotating turbine blade;
   a pair of first seal slots for receiving a pair of first spline seal plates, the first seal slots being formed on circumferentially both sides of the first plate portion and extended substantially across a whole length of the first plate portion;
   a pair of second seal slots for receiving a pair of second spline seal plates, the second seal slots being formed on circumferentially both sides of the second plate portion and extended substantially across a whole length of the second plate portion;
   a pair of seal gaps respectively communicating with the first seal slots and the second seal slots, the seal gaps respectively comprising abutment surfaces recessed from front surfaces of the second seal slots so as to receive front ends of the first spline seal plates; and a front seal connected with a front end surface of the back plate so as to seal hot combustion gas leakage from a radially inner side of the back plate to the turbine case.

8. The shroud segment of claim 7, wherein:

the front seal is configured to steadily contact with an outer band of a turbine nozzle disposed at a former stage of the shroud segment by means of elastic force thereof.

* * * * *